United States Patent [19]

Kao

[11] Patent Number: 4,924,209

[45] Date of Patent: May 8, 1990

[54] CAR FENDER WITH BRAKE LIGHT DEVICE

[76] Inventor: Chung-Chen Kao, No. 2-3 Tsou Tsuoh Luen, Shoei Yuan Li, Tansui, Taipei, Taiwan.

[21] Appl. No.: 356,851

[22] Filed: May 25, 1989

[51] Int. Cl.$^5$ ............................................... B60Q 1/44
[52] U.S. Cl. ...................................... 340/479; 362/80; 362/83
[58] Field of Search .................... 340/479; 362/83, 80, 362/83.3

[56] References Cited

U.S. PATENT DOCUMENTS

| | | | |
|---|---|---|---|
| 4,373,153 | 2/1983 | Sano et al. | 340/479 |
| 4,532,578 | 7/1985 | Gadeh et al. | 362/83 |
| 4,797,792 | 1/1989 | Oen | 362/83 |

Primary Examiner—Donnie L. Crosland
Attorney, Agent, or Firm—Asian Pacific Int'l Patent & Trademark Office

[57] ABSTRACT

A car fender with brake light device, including a fender sheet having a light seat, a circuit board having brake lights, and a light cover fitted to the light seat to encapsulate the circuit board for waterproof ability, by means of a set of wires and conducting plates disposed through the fender sheet, the brake lights being electrically connected with the brake circuit of a car whereby when the brake is applied, the brake lights will be lighted up to indicate the following drivers to slow down, eliminating unnecessary car accidents.

2 Claims, 3 Drawing Sheets

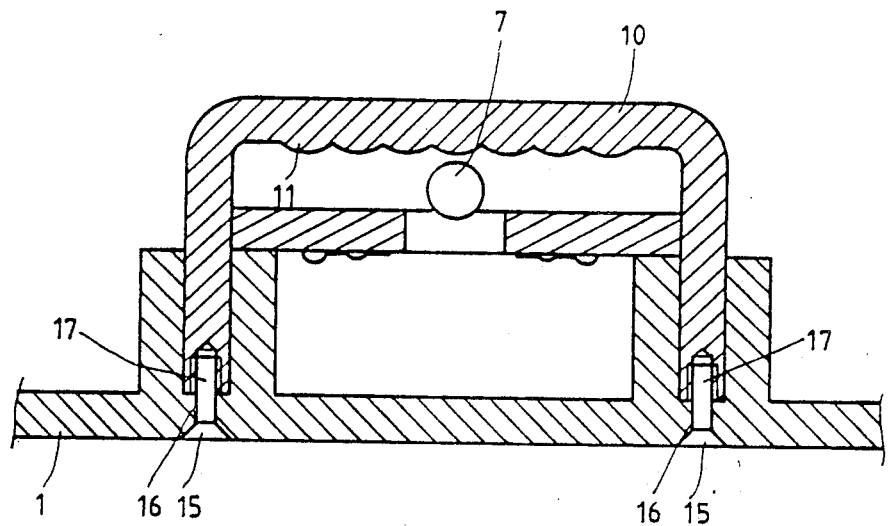
F I G. 2A

CAR FENDER WITH BRAKE LIGHT DEVICE

BACKGROUND OF THE INVENTION

A brake light is an indispensable device to a car. It can provide warning signals for the rearward drivers when the brake is applied to reduce the speed of a car.

Moreover, when at night or in a bad weather condition, a car without a brake light or clear light means indicating the location thereof is highly apt to cause a car accident and put the driver in pretty dangerous situation.

It is therefore tried by the applicant to deal with a newly designed brake light, which can provide satisfactory brake warning function for the drivers to avoid possible car accidents.

SUMMARY OF THE INVENTION

According to the present invention, a car fender is provided with a brake light device and disposed behind the rear wheel of a car. The brake light device is electrically connected to the brake circuit of the car whereby when the brake is applied to reduce the speed of the car, the brake light device is lighted up to give more clear warning signals for the rearward drivers to reduce their cars speeds accordingly.

The present invention can be best understood through the following description and the accompanying drawings wherein:

BRIEF DESCRIPTION OF THE DRAWINGS

FIG. 2A is a cross-sectional view taken on A—A line of FIG. 2.

DETAILED DESCRIPTION OF THE PREFERRED EMBODIMENT

Figure 1:
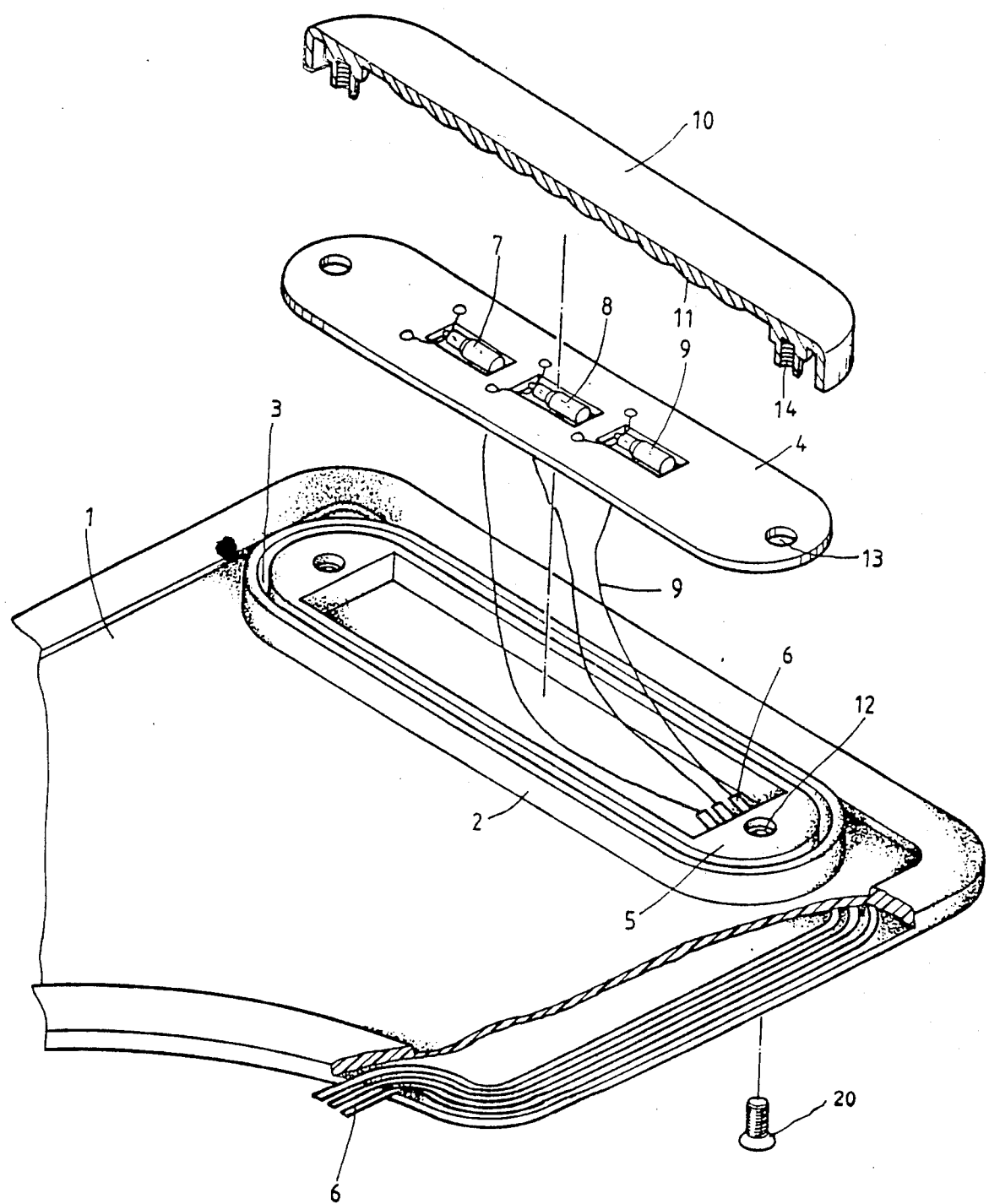
FIG. 1 is a perspective exploded view of the present invention.

Please refer to FIG. 1 the car fender of the present invention is disposed behind the rear wheel of a car, including a fender sheet 1 having a light seat 2 provided with a peripheral groove 3, a circuit board 4 mounted on the light seat 2, and a light cover 10 fitted in the peripheral groove 3 of the light seat 2 to encapsulate the circuit board 4 for waterproof ability. Two position lights 7 and a brake light 8 are mounted on the circuit board 4.

The position lights 7 and brake light 8 are electrically connected to a set of conducting plates 6 via a set of wires 9, the conducting plates 6 being extended through the fender sheet 1 to electrically connect with external brake circuit and activating circuit, whereby the position lights 7 are kept lighted when the car is running while the brake light 8 is lighted when the brake is applied.

A bolt 20 can go through hole 12 of the light seat 2 and hole 13 of the circuit board 4 and screw into thread hole 14 of the light cover 10 to fixedly associate the light cover 10 and circuit board 4 with the light seat 2.

Figure 2:
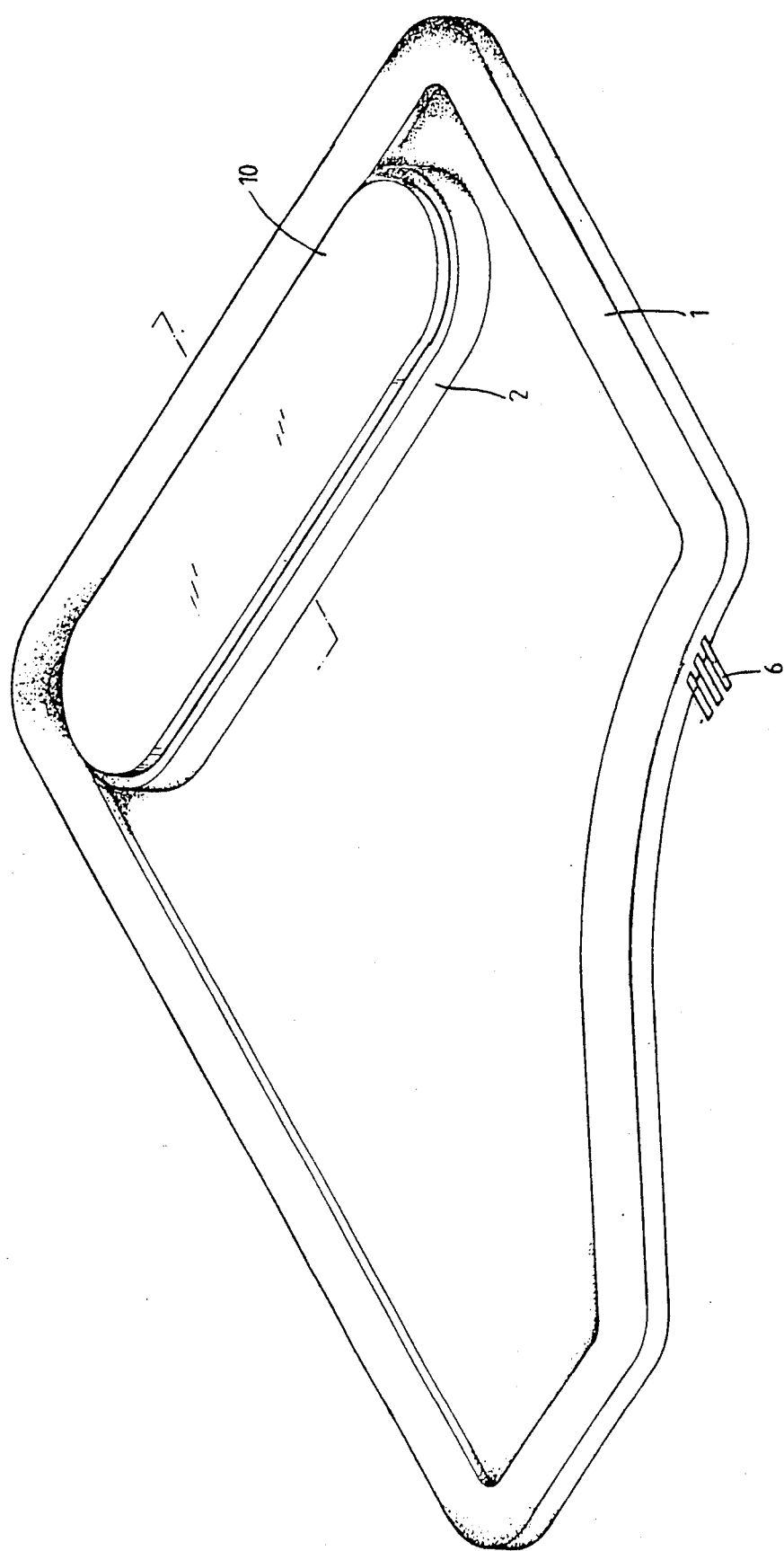
FIG. 2 is a perspective view of the present invention.

As shown in FIG. 2A, a bolt 15 is screwed through the hole 16 of the fender 1 into the thread hole 17 of the light cover 10 to further closely connect the light cover 10 with the fender 1 for waterproof ability.

I claim:

1. A car fender with brake light device, comprising:
   a fender sheet having a light seat provided with a peripheral groove;
   a circuit board having conducting plates, position light means and brake light means, said circuit board being mounted on said light seat; and
   a light cover fitted in said peripheral groove of said light seat to encapsulate said circuit board for waterproof ability, a set of wires being disposed on said circuit board to electrically connected said light means with said conducting plates, said conducting plates being extended through said fender sheet to electrically connect with external brake circuit and activating circuit, whereby said brake light means is lighted when the brake of a car is applied.

2. A car fender as claimed in claim 1, wherein said light seat, circuit board, and light cover are provided with corresponding holes, permitting securing means to go therethrough to fasten said light seat, circuit board, and light cover together.

* * * * *